May 30, 1944. D. B. REPLOGLE 2,349,832
SPECTACULAR DUST INDICATOR FOR AIRWAY SANITARY CLEANING SYSTEMS
Filed Oct. 20, 1941 2 Sheets-Sheet 1
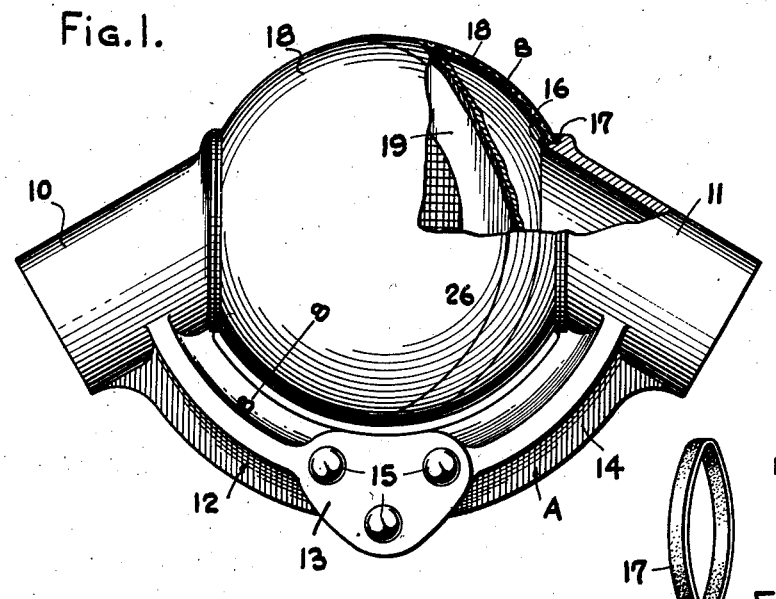
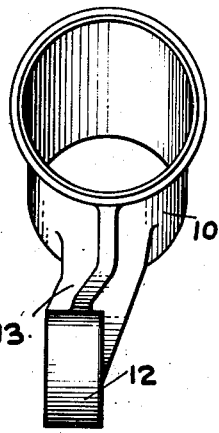
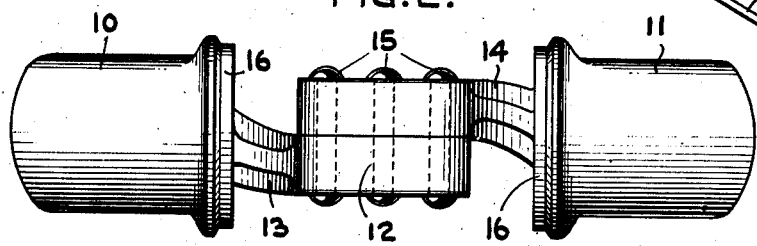
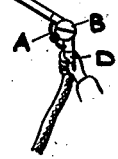
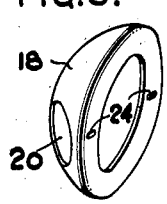
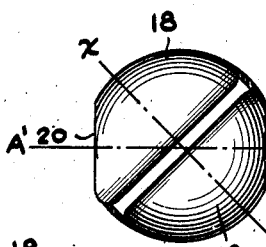
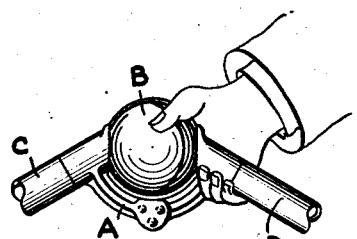
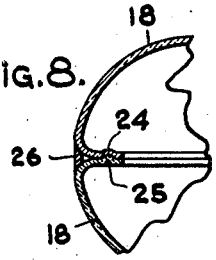
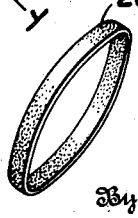
Inventor
D. B. REPLOGLE,
By Munson H. Lane
Attorney May 30, 1944.    D. B. REPLOGLE    2,349,832
SPECTACULAR DUST INDICATOR FOR AIRWAY SANITARY CLEANING SYSTEMS
Filed Oct. 20, 1941    2 Sheets-Sheet 2
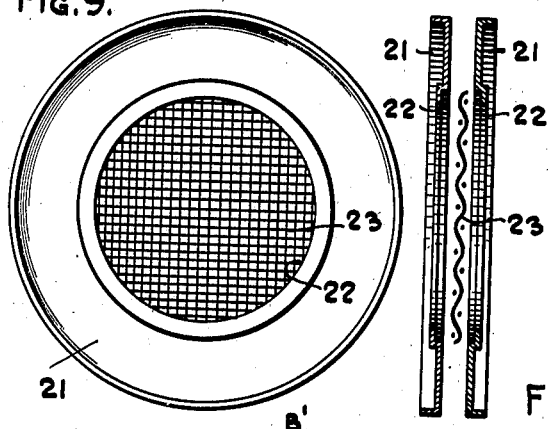
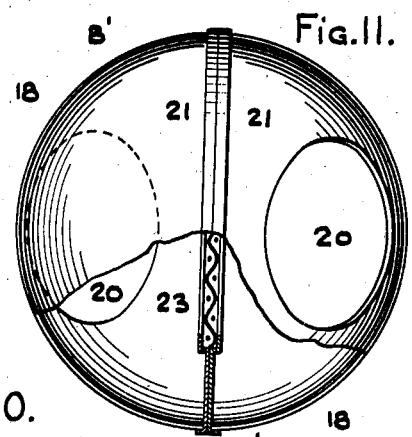
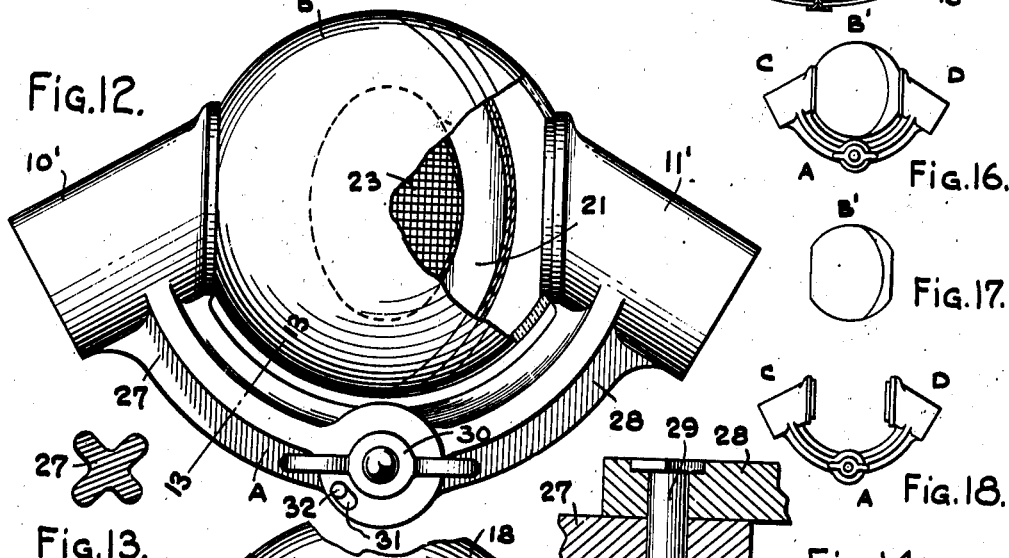
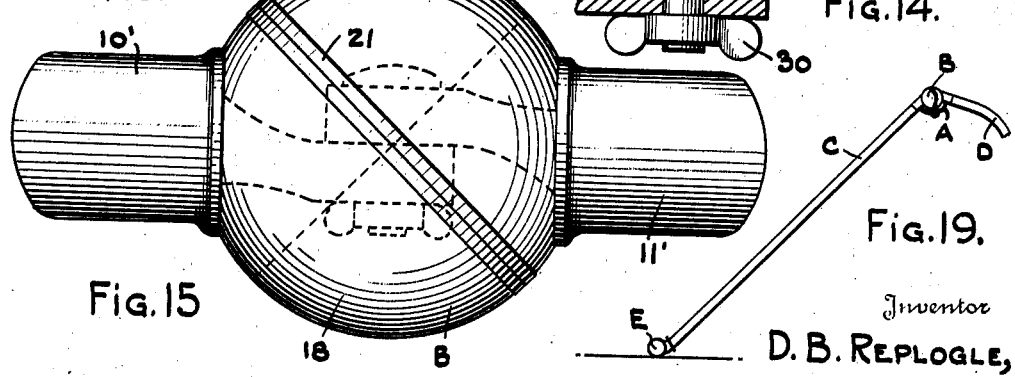
Inventor
D. B. REPLOGLE,
By Munson H. Lane
Attorney Patented May 30, 1944

2,349,832

UNITED STATES PATENT OFFICE 2,349,832

SPECTACULAR DUST INDICATOR FOR AIRWAY SANITARY CLEANING SYSTEMS

Daniel Benson Replogle, Berkeley, Calif.; Bank of America National Trust and Savings Association, Carl S. Replogle, Harold E. Queen, and Laurie H. Bullock, executors of said Daniel Benson Replogle, deceased, assignors to The Ohio Citizens Trust Company, Toledo, Ohio, a corporation of Ohio, as trustee Application October 20, 1941, Serial No. 415,800

9 Claims. (Cl. 302—65)

The invention relates primarily to dust indicators for suction cleaners, although in some of its phases the invention may be applied to other fields, as for example to the fields of educational and advertising devices. The primary object of the invention as set forth in the present specification is to provide a dust indicator which will clearly demonstrate to the operator of a suction cleaner or the like the quantity and quality of dust passing through the tubular elements of the system. The indicator is adapted to be suitably located between a pair of successive tubular elements of the cleaning system positioned intermediate the cleaning nozzle and the source of suction.

The invention will be more readily understood by reference to the accompanying drawings, in which two specific embodiments of the inventive thought are set forth by way of illustration rather than by way of limitation.

In the drawings:

Fig. 1 is an elevation showing one form of globular transparent element mounted in its coupling yoke.

Fig. 2 is a top plan view of the yoke or coupling element with the globular member removed.

Fig. 3 is an elevation of one-half of the yoke looking at it from the center of the globe outwardly.

Fig. 4 is a detail view showing a rubber band or sealing band adapted to fit around the neck of the entering part of the yoke and also around the bearing so as to form a seal against leakage of air when the globular element is put in place.

Fig. 5 is a perspective view showing one of the two hemispherical parts of the globe.

Fig. 6 is a view illustrating the parts of the globe in an assembled position and also showing the axis of rotation.

Fig. 7 is a detail view showing a rubber band adapted to engirdle the equator formed on the axis X—Y of Fig. 6, for the purpose of holding the parts assembled.

Fig. 8 is a section on line 8—8 of Fig. 1 illustrating the means for anchoring the diaphragm laminations against circumferential shifting.

Fig. 9 is an elevation showing the central diaphragm portion of the globular element.

Fig. 10 is a sectional view showing the laminations of the diaphragm and the screen which is adapted to be inserted between the same, the parts being shown slightly separated for the purpose of better illustration.

Fig. 11 is an elevation showing the globular element with a portion broken away to better illustrate the diaphragm and screen.

Fig. 12 is an elevation similar to Fig. 1, partly broken away to show the interior, illustrating the modification of the yoke wherein parts of the yoke are hinged together to facilitate mounting of the globular member.

Fig. 13 is a section on line 13—13 of Fig. 12.

Fig. 14 is a cross sectional view showing the hinging of the two parts of the yoke.

Fig. 15 is a plan view of the assembled portion in Fig. 12.

Figs. 16, 17 and 18 are views suggestive of the methods used in mounting the globular element in the alternative form.

Fig. 19 is a diagrammatic view illustrating the globular element and yoke applied to a suction cleaning system.

Fig. 20 is a similar view indicating the manner of clearing the chamber of the globular element by holding the device with its axis pointing vertical.

Fig. 21 is a diagrammatic view illustrating the grasping of the device in the hand of the operator in such position that the globular part may be readily revolved and manipulated by the action of the thumb of the user.

According to the present invention the dust indicator comprises a yoke or coupling element and a transparent globular display element, the latter of which is provided with two circular polar openings, one for the admission of dust laden air to the globular element and the other designed for the discharge of air therefrom. The globe is adjustably mounted for rotation about a polar axis passing through the centers of the two openings, and is supported by the yoke or coupling element, which is provided with inlet and outlet pipes whose axes are inclined with reference to the axis of rotation of the globular element.

These inclined pipes are adapted to fit the inlet and outlet polar openings of said globe when the globe is positioned within the yoke so as to provide a fluid tight connection. In this manner a whirling of the dust laden air within the globular element is insured.

The globular element is preferably formed of two hemispherical parts which include between them a ring-like diaphragm whose central opening may be covered by a screen to prevent passage of large particles such as articles of jewelry and the like. The plane of this diaphragm is preferably inclined at an angle of about twenty-two and one-half degrees to the normal equator or at about sixty-seven and one-half degrees with reference to the axis of rotation.

The present application discloses two specific embodiments, one based on a cheaper, light weight article, and the other on a heavier and stronger construction. In either case the device comprises two main elements; to wit, a yoke or coupling element, and a globular or display element.

Referring to the drawings and with particular reference to Figs. 19, 20 and 21, A denotes a suitable yoke, connector or coupling adapted to receive a transparent globular element B, the yoke being interposed between successive tubular members C and D of the suction cleaning system. As shown the member C is a rigid suction pipe or hollow wand to the lower end of which may be attached a suitable floor tool or nozzle E. The member D may be a flexible tube suitably connected to a source of suction (not shown).

The yoke, connector or coupling element A includes an inlet pipe 10 which may be connected to the tubular member C of the system and outlet pipe 11 which may be connected to the tubular member D. The pipes 10 and 11 are held in fixed inclined relation to each other by means of a rigid bracket 12 portion which may be formed in two parts 13 and 14 held together by suitable connecting bolts 15 or the parts may be made in one piece if desired. The central axes of the pipes 10 and 11 are inclined with reference to each other but lie in the same plane. The pipes are provided with annular lip portions 16 which are adapted to form bearings upon which the globular element B may be rotated about a polar axis. Sealing rings 17 may be fitted over the lip 16—16 to insure a fluid tight fit when the globular element B is snapped into position.

The globular element B comprises two hemispherical portions 18—18 joined together, with a diaphragm 19 between them (Fig. 11). The globular element is provided with circular polar openings 20—20 which are adapted to fit the lip portions 16—16 and compress the sealing rings 17—17. The transparent part or shell of the globe may be made of Celluloid, vinyl resin, methyl methacrylate or other clear plastics. When assembled or mounted in the yoke or coupling the globe may be rotated by the thumb and finger of the operator about an axis A'B' passing through the centers of the circles forming the polar openings in the globular member. The plane of the diaphragm 19 is preferably angularly off-set about sixty-seven and one-half degrees with reference to the axis of rotation A'B' or about twenty-two and one-half degrees with reference to the plane of the normal equator, which lies at right angles to the axis A'B'. Figure 21 illustrates the manner in which the globe may be rotated by the operator while holding the device in his hands during the sweeping operation. The diaphragm 19 may be composed of two ring portions 21—21 having central openings 22—22. When the ring portions 21—21 are brought together they will press between them a screen 23 which will prevent the passage of large particles or valuable objects such as jewelry and the like. Preferably the rings 21—21 are secured to the respective halves 18—18 of the globular element. To prevent shifting of the rings 21—21 with reference to one another suitable securing means may be provided as for example, a pair of bosses 24—24 on one of the ring members and corresponding indentations 25—25 on the other, the bosses fitting in the indentations when the parts are properly assembled, thus preventing the parts from sliding circumferentially with reference to one another. These securing means are so arranged as to bring the parts to the position shown in Fig. 6, with the centers of the circular end openings 20—20 in line with the axis A'B'. When so fitted together the hemispheres may be held in position by means of a resilient ring or rubber band 26 engirdling the equator formed on the axis X—Y. The parts thus assembled are held by the fingers and compressed against the sealing rings 17—17 and the flexible sides of the globular element until the circles at the end of the axis A'B' slip into position over the lips of the yoke, on which lips they are adapted to revolve as on a bearing.

Where the globe is to be made of more rigid materials, the two halves of the yoke may be hinged together as shown in the modification of the invention illustrated in Figs. 12 to 18 inclusive. In this device the two halves 27 and 28 of the bracket portion of the yoke are hinged together about a bearing 29 and suitably held together by a wing nut 30; limited movement is permitted by means of a slot 31 and pin 32, when the wing nut 30 is unscrewed. This permits spreading the inlet pipes 10' and 11' apart sufficiently to permit insertion of the globular element B'.

The operation will be more readily understood from the foregoing description. Dust laden air, drawn in through the suction pipe C of the system, enters the transparent globular element of the indicator through the inclined inlet pipe 10 or 10' and whirling of the dust is insured by reason of the ring members 19, the air eventually passing out through the center of the diaphragm to the outlet pipe 11 or 11'. The globular element may be rotated by the fingers of the operator to vary the direction of whirl. Should the screen which covers the opening in the diaphragm become clouded or crowded with lint etc., the globular element where formed of flexible material as illustrated in the first embodiment of the invention, may be compressed endwise until it slips out of position in its bearings, then may be turned end for end and re-snapped into position so that the direction of the current through the diaphragm is the reverse of that at the time the accumulation of dust occurred. Similarly if the heavier form of globular member B' illustrated in the second embodiment of the invention be employed, this member may be removed by simply loosening the wing nut 30 and separating the inlet and outlet pipes sufficiently to allow removal and reinsertion of the globular element, after having been turned end for end.

The invention has been described in detail for the purpose of illustration but it will be obvious that numerous modifications and variations may be resorted to without departing from the spirit of the invention.

For example the device is not limited in its use to indicating devices for suction cleaning systems but may also be employed for advertising or display purposes; thus in a geographical or war display the globe might be decorated to represent oceans or continents or other education or ornamental features might be designated upon the globe.

What I claim is:

1. In a suction cleaning system including a suction nozzle, a source of suction, and a plurality of intermediate tubular elements; a dust indicator interposed between a pair of successive tubular elements, comprising a coupling member having an inlet and outlet pipe whose axes lie in the same plane but are inclined with reference to each other, and a transparent globular element rotatably mounted in said coupling member and having circular polar openings adapted to fit over circular bearing members at the inlet and outlet portions of the pipes of the coupling members.

2. The system as set forth in claim 1, wherein the globular element is mounted for rotation about an axis passing through the centers of said polar openings; and a deflecting diaphragm is provided lying in a plane which is angularly offset with reference to said axis and with reference to the normal equator of said globular element.

3. In a dust indicator of the kind described, a hollow globular element constructed of transparent, resilient material, the said globular element being adapted to be revolved on a diametric axis on bearings formed by cutting circular openings on parallel planes from opposite ends of the globular element, said axis being in line with the travel of the dust laden stream of air, and circumferentially turnable on its axis, with means inside of the globular element for alternately directing a current of air into clockwise or anti-clockwise whirls during the process of turning the globular element in either direction.

4. An indicator for suction cleaning systems, comprising a coupling member having an inlet pipe for admission of dust laden air and an outlet pipe for removal of dust laden air, and a transparent globular element rotatably mounted in said coupling member, having oppositely disposed axial end openings registering with the inlet and outlet portions of said pipes, and bearings carried by said pipes permitting rotation of said globular element about an axis which passes through the centers of said end openings.

5. An indicator as set forth in claim 4 wherein the globular element is composed of a compressible material to permit its insertion or removal from the coupling member.

6. An indicator as set forth in claim 4 wherein the inlet and outlet pipes are adjustably mounted with reference to each other to permit assembling and disassembling of said globular element.

7. An indicator as set forth in claim 4 wherein the globular element is provided with a diaphragm mounted in a plane angularly removed from the normal equator.

8. An indicator as set forth in claim 4 wherein the axes of said inlet and outlet pipes are inclined with reference to the axis of rotation of said globular element.

9. A display device for observing material movement in a stream of fluid passing through a conduit, comprising a coupling member adapted to be positioned within the conduit, said coupling member having an inlet pipe and an outlet pipe, a transparent globular element rotatably mounted in said coupling member and having oppositely disposed axial end openings registering with the inlet and outlet portions of said pipes and a diaphragm in said globular element mounted in a plane angularly removed from the normal equator or axis of rotation of said globular element.

DANIEL BENSON REPLOGLE.